(12) United States Patent
Tom

(10) Patent No.: US 7,619,686 B2
(45) Date of Patent: Nov. 17, 2009

(54) APPARATUS FOR A COMBINATION CAMCORDER-HANDSET DEVICE

(75) Inventor: Alfred Tom, Lafayette, CA (US)

(73) Assignee: Kantan Inc., San Francisco, CA (US)

( * ) Notice: Subject to any disclaimer, the term of this patent is extended or adjusted under 35 U.S.C. 154(b) by 774 days.

(21) Appl. No.: 10/807,840

(22) Filed: Mar. 23, 2004

(65) Prior Publication Data

US 2004/0189861 A1     Sep. 30, 2004

Related U.S. Application Data

(60) Provisional application No. 60/457,402, filed on Mar. 24, 2003.

(51) Int. Cl.
*H04N 5/225* (2006.01)
*H04M 1/00* (2006.01)

(52) U.S. Cl. .................... 348/376; 455/556.1

(58) Field of Classification Search ............. 455/550.1, 455/556.1, 556.2, 566, 575.1, 575.3, 90.3; 348/373, 376
See application file for complete search history.

(56) References Cited

U.S. PATENT DOCUMENTS

| | | | | |
|---|---|---|---|---|
| 6,069,648 | A * | 5/2000 | Suso et al. | 348/14.02 |
| 6,243,578 | B1 | 6/2001 | Koike | |
| 6,327,001 | B1 * | 12/2001 | Yamagishi | 348/552 |
| 6,700,621 | B1 * | 3/2004 | Seo | 348/375 |
| 7,084,919 | B2 * | 8/2006 | Shibata et al. | 348/333.06 |
| 2002/0051060 | A1 | 5/2002 | Wada | |
| 2003/0036365 | A1 | 2/2003 | Kuroda | |
| 2003/0040346 | A1 | 2/2003 | Fukuda | |
| 2003/0109232 | A1 | 6/2003 | Park | |
| 2003/0227564 | A1 | 12/2003 | Lim | |
| 2004/0023684 | A1 | 2/2004 | Sato | |
| 2004/0048633 | A1 | 3/2004 | Sato | |
| 2004/0051779 | A1 | 3/2004 | Tatehana | |
| 2004/0056977 | A1 | 3/2004 | Kim | |
| 2004/0058715 | A1 | 3/2004 | Taniguchi | |

FOREIGN PATENT DOCUMENTS

JP         11017790         1/1999

* cited by examiner

*Primary Examiner*—Justin P Misleh
(74) *Attorney, Agent, or Firm*—Courtney Staniford & Gregory LLP

(57) ABSTRACT

A combination camcorder handset device in a clam-shell form factor that has at least two operational modes-one of which is a phone mode wherein the device is used by holding the device to the ear and talking, and another of which is a camera mode wherein the device is rotated on its side so the screen is pointed horizontally and the device is held in one hand just like a traditional camcorder. The angle of the device's clam-shell hinge determines the operational mode. The camera points in a direction perpendicular to the axis along which the keys on the keyboard keys move when pressed. The camera may be contained in a removable camera module. Straps on the keyboard half hold the device in place when the device is held with one hand during camera mode. Buttons along the side of the keyboard half perform functions such as shutter release, zoom-in, and zoom-out, and are within immediate access of the fingers of the hand that is holding the device.

7 Claims, 4 Drawing Sheets

APPARATUS FOR A COMBINATION CAMCORDER-HANDSET DEVICE

This application is based upon provisional application #60/457,402 with a filing date of Mar. 24, 2003.

FIELD OF THE INVENTION

The present invention is generally directed to wireless communication devices and related apparatus. More particularly, this invention relates to a device that is a combination between a camcorder and a telephone handset.

BACKGROUND OF THE INVENTION

In Asia the most popular handset form factor is the clamshell. This design splits a handset into two halves connected by a hinge-one half that contains the keyboard and one half that contains the display. When the clam-shell is closed and the hinge angle is 0 degrees, the keyboard and display are protected. When the clam-shell is open the user can use the keyboard to make and receive telephone calls.

Handsets with cameras are also becoming increasingly popular in the world. However, the problem of efficiently integrating a camera into a clam-shell design is difficult. One solution, used by handset manufacturers such as NEC, places the camera in the screen half so that when the clam-shell is open the lens points away from the user. However, the screen half has to be very thick to house a telephoto or zoom lens. Another solution, used by vendors such as Samsung, places the camera in the hinge that connects the keyboard and screen halves. In some cases the lens can rotate to face towards or away from the user while the display is still visible by the user. However, it is still difficult to house a large lens or a flash in the hinge.

The above solutions have the additional problem of an awkward user-interface. In order to activate the camera mode, the user must navigate a screen-based menu-system to activate the camera mode. In addition, it is not clear to the user which button to press to release the shutter, zoom-in, or zoom-out.

Furthermore, there is a screen orientation problem. Traditional cameras have viewfinders in landscape orientation. The displays on clam-shell designs are vertically oriented. This means the display must either crop a landscape image to a portrait for viewing, or only use part of the display to view the scene in landscape format. Neither is desirable.

The device described herein is a unique solution to the aforementioned problems. It has the following advantages:
1. A long optical lens can be used in the device without difficulty.
2. The device uses a more familiar landscape orientation of the display when taking pictures or videos.
3. The user does not have to navigate a screen-based menu-system to activate and use the camera functionality.
4. When the device is used as a camera, the device held like a traditional camcorder, thus making the apparatus easier and more intuitive to use.
5. The camera components can be placed in a removable module that can be replaced to achieve different optical capabilities.

SUMMARY OF THE INVENTION

The present invention provides an apparatus directed to a combination camcorder-handset device that has superior form factor, usability, and functionality than prior-art camera phones.

A clam-shell device that has at least two operational modes, one of which is a camera and one of which is a phone, can change its mode depending on the angle of the screen with respect to the keyboard. This allows the user to change the mode just by rotating the screen instead of navigating a cumbersome user interface using the keypad.

The clam-shell device may position the camera lens in a manner that the camera points in a direction perpendicular to the axis along which the number keys in the keyboard are actuated when pressed. This allows the device to house a much longer lens than if the lens were pointing in a direction parallel to the keypad actuation axis since the casing is very thin in this parallel direction, yet long in the perpendicular direction. The camera lens may be housed in a camera module that can be removed from the keyboard half and replaced by another module with a different lens. This gives the user flexibility with respect to using different focal-length lenses.

The device may contain additional camera buttons separate from the traditional keypad on the device. These buttons have specific functions when the device is in camera mode. These buttons may be located on the side of the device, adjacent and perpendicular to the side that contains the number keypad (not the side that contains the hinge, nor the side that is opposite the side containing the hinge). The axis of actuation of these buttons may be perpendicular to the axis of actuation of the keys on the keypad. The buttons may include a shutter release button and zoom-in and zoom-out buttons. The device may also have one or more straps to hold the device in the user's hand when the user is actuating the camera buttons. These extra buttons and straps allow the user to hold the device like a traditional camcorder when the device is in camera mode.

Other objects and advantages of the invention will become apparent upon further consideration of the specification and drawings. While the following description may contain many specific details describing particular embodiments of the invention, this should not be construed as limitations to the scope of the invention, but rather as an exemplification of preferred embodiments. For each aspect of the invention, many variations are possible as suggested herein that are known to those of ordinary skill in the art.

DETAILED DESCRIPTION OF THE INVENTION

Figure 1:
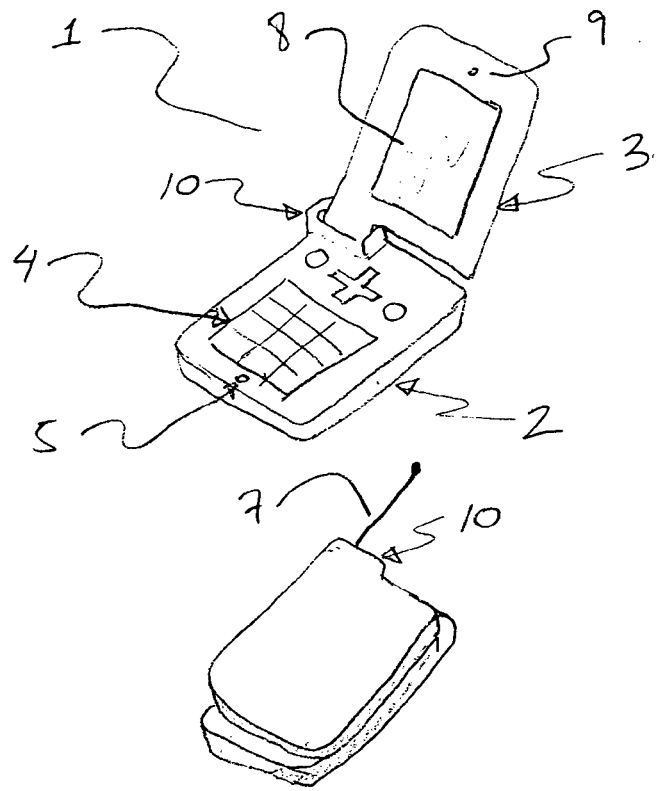
FIG. 1 is a simplified diagram illustrating a typical clam-shell form factor that can be used as a reference to show the current state of the art.

FIG. 1 shows a typical clam-shell handset that can be seen on the market today. Such a clam-shell handset has two main halves-the keyboard half 2 and the screen half 3. The keyboard half 2 may contain, among other components, the keyboard 4, and the microphone 5. The screen half 3 may contain, among other components, the display 8 and the speaker 9. There may be a hinge 10 or set of hinges that connects the two halves 2 3 and allows them rotate at different angles with respect to one another. FIG. 1 shows that when the angle between the keyboard half 2 and the screen half 3 is 0 degrees, the handset is in a closed position where the two halves 2 3 are shut together and the keyboard 4 and display 8 are hidden from view.

The present invention provides an apparatus or device 1 that is a significant improvement on the typical clam-shell handset in such cases when the handset has combination camera/phone functionality. The particular features of the described embodiments in the following description may be considered individually or in combination with other variations and aspects of the invention.

Figure 2:
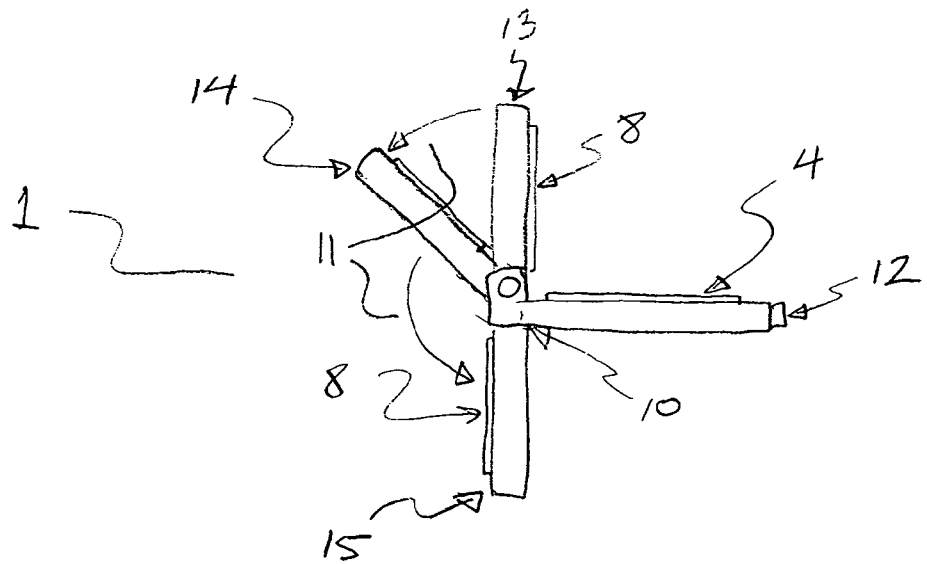
FIG. 2 is a simplified side view of the apparatus illustrating how the screen half may rotate with respect to the keyboard half. It also shows the three operational positions (~90 degree camera mode, ~135 degree phone mode, and ~270 degree camera mode) and the placement and direction of the camera.

The device 1 may have multiple modes of operation. One may be a phone mode where the user may make and receive phone calls using the keyboard 4. Another may be a camera mode where the user may take pictures or record videos using an attached or built-in camera 12. As seen in FIG. 2, the angle 11 of the keyboard half 2 with respect to the screen half 3 may determine the mode. When the angle 11 is in a ~90 degree position 13, the device 1 may activate a camera mode wherein the camera 12 is pointed towards the user and the user's image is shown on the screen 8. When the angle 11 is at a ~135 degree position 14, the device 1 may activate a phone mode, wherein the angle 11 is in a good position to allow the user to receive or make calls. When the angle 11 is at a ~270 degree position 15, the device 1 may activate a second camera mode, wherein the camera 12 may be pointed away from the user and the user may see the camera image on the display 8. The hinge 10 may contain a mechanism that senses the different positions of the angle 11, enabling the device 1 to change modes depending on the hinge position or angle 11. There are many such mechanisms commonly used in the industry today and thus the particulars of the mechanism need not be discussed here. Thus, the hinge angle 11 may determine the operational mode of the device 1.

The device 1 may activate an operational mode as soon as the hinge 10 is at a certain angle, or a mode may be activated when hinge 10 is at an angle for a minimum period of time. For example, a user may open the device 1 and put the angle 11 at ~90 degrees 13. In some embodiments, the device 1 may immediately switch to the camera mode. In another embodiment, the device 1 may switch to the camera mode after the angle 11 is at the position 13 for 500 ms.

The hinge 10 that connects the keyboard and screen halves 2 3 may have a mechanical stop that prevents the angle 11 from increasing beyond the phone mode angle 14. This is to allow the screen half 3 to remain steady when the user is talking and the display 8 is pressed to the user's ear. If the user desires to rotate the screen half 3 to the ~270 degree position 15, the user may activate a mechanical stop release that may allow the hinge 10 to rotate greater than the phone mode angle 14 to reach the ~270 degree angle 15. When the user returns the angle 11 to the phone mode angle 14, the mechanical stop may be reactivated. These mechanical stops are commonly used in the industry today and thus the particulars of the mechanical stop need not be discussed here.

The hinge 10 may have a cam mechanism that encourages the hinge 10 to stay at a mode position unless the user applies force to move the hinge 10 out of the mode position. The behavior may be similar to how a car door stays open at certain angles. Any kind of cam mechanism commonly used today may be used in the hinge 10.

Figure 3:
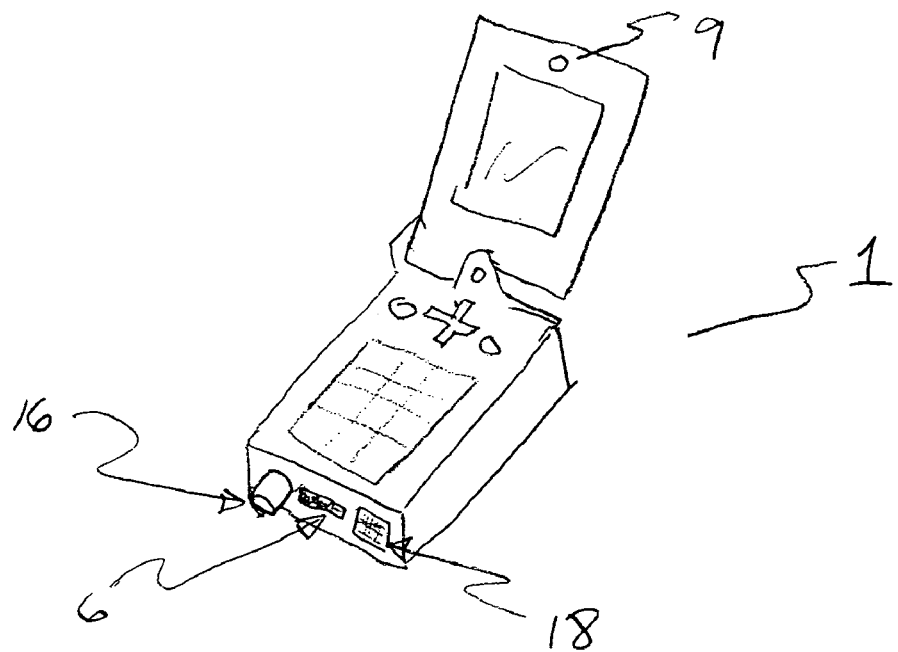
FIG. 3 is a simplified diagram illustrating the apparatus and the position of the camera lens, flash, and peripheral connector.
Figure 4:
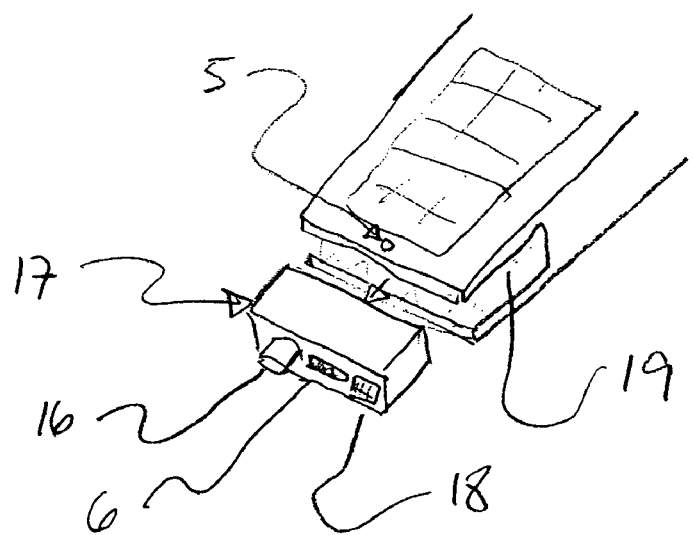
FIG. 4 is a simplified diagram illustrating the apparatus with a removable camera module.

The keyboard half 2 may contain an image sensor and camera lens 16 on the side opposite to the hinge 10, as shown in FIG. 3. The camera lens 16 may be positioned to point away from the hinge 10. The lens 16 and sensor may be encased in a removable camera module 17, along with other components such as a flash 18 or a peripheral connector 6, as shown in FIG. 4. The connector 19 on the keyboard half 2 that connects the keyboard half 2 to the removable module 17 may also connect to other camera modules that have different optical capabilities, such as wide-angle, telephoto, or zoom lens, or no lens at all. Interchangeable camera modules 17 enable flexibility in the device 1. The connector 19 may also have pins that allow the keyboard half 2 to communicate with the removable camera module 17. This information exchanged may include imaging data, peripheral signals (like battery power, serial connection, and headset jack), flash signals, and operational commands for the imaging system.

Figure 5:
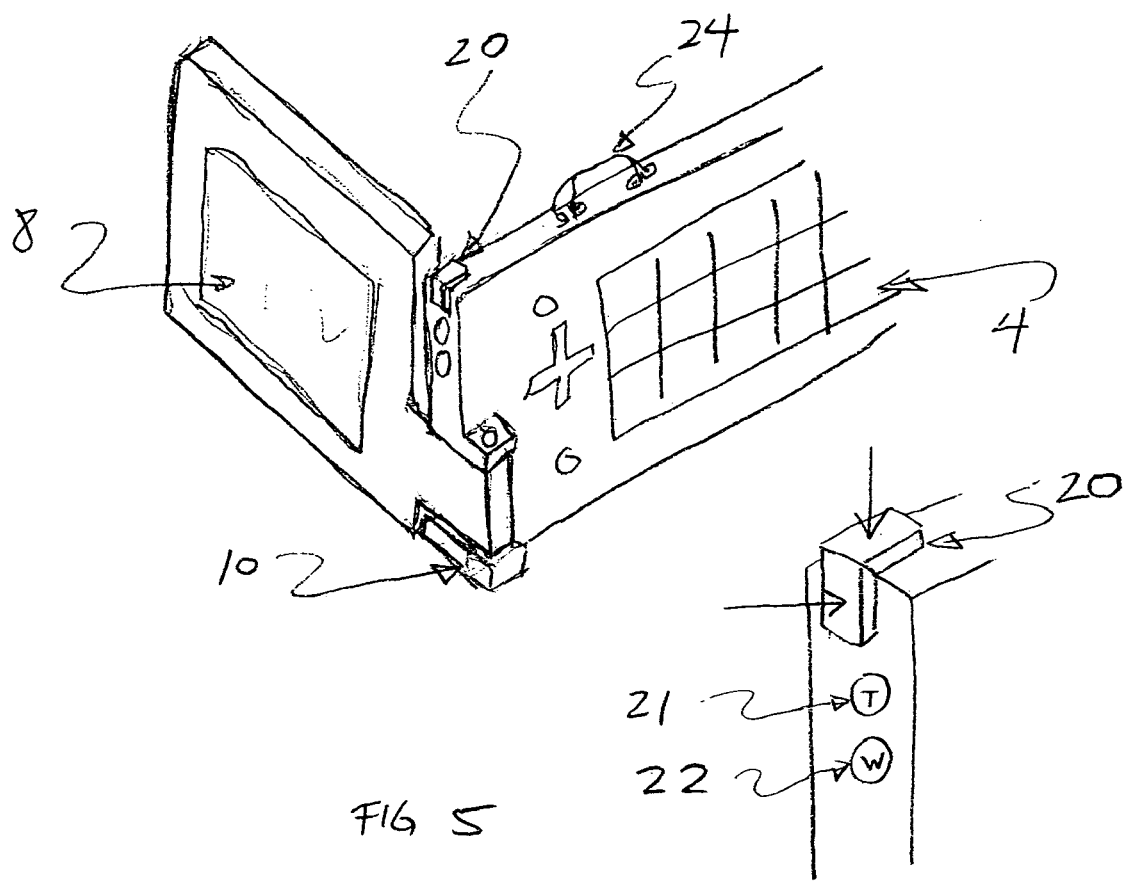
FIG. 5 is a simplified diagram that shows the position of the display, shutter button, finger strap, hinge, and keyboard when the apparatus is in the camera mode.
Figure 6:
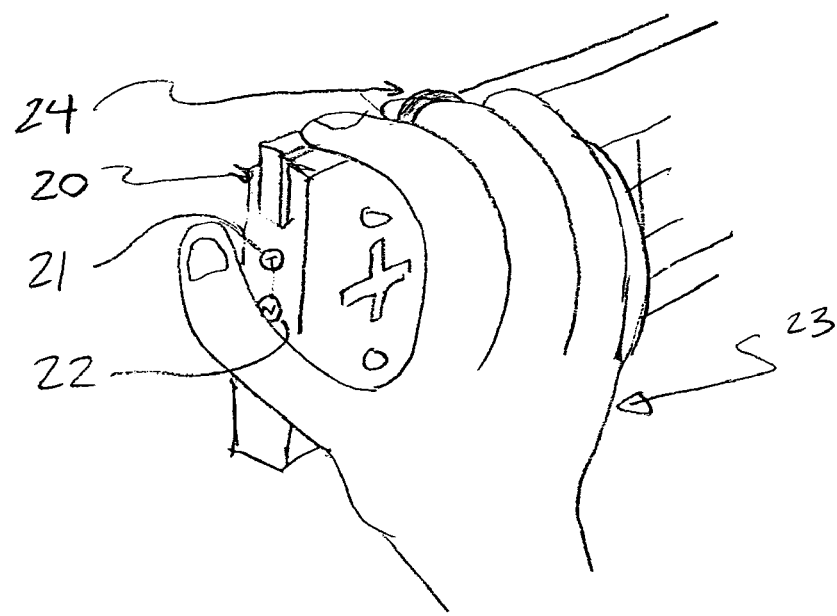
FIG. 6 is a simplified diagram that shows how a user may hold the apparatus when the apparatus is in the camera mode.

FIG. 5 shows a device 1 that may have additional buttons on the keyboard half 2. One button (the "shutter release button") 20 may be used to snap a picture or start/stop a video recording when the device 1 is in camera mode. There also may be a zoom-in button 21 and a zoom-out button 22. As shown in FIG. 6, the buttons 21 22 may be placed in a location close to the hinge 10 that allows the user to push the buttons 21 22 with the right thumb when the device 1 is in camera mode and the user is holding the device 1 with the right hand 23.

The shutter release button 20 may be located on the corner of the keyboard half 2 and wrapped around the corner in such a way so as the button can be pressed from the back with the thumb or from the top with the index or middle finger. The device 1 may have one or more straps 24 that attach the device 1 to the user's finger(s) or hand 23 when the device 1 is in camera mode. The straps 24 may be adjustable to fit different size hands.

Figure 7:
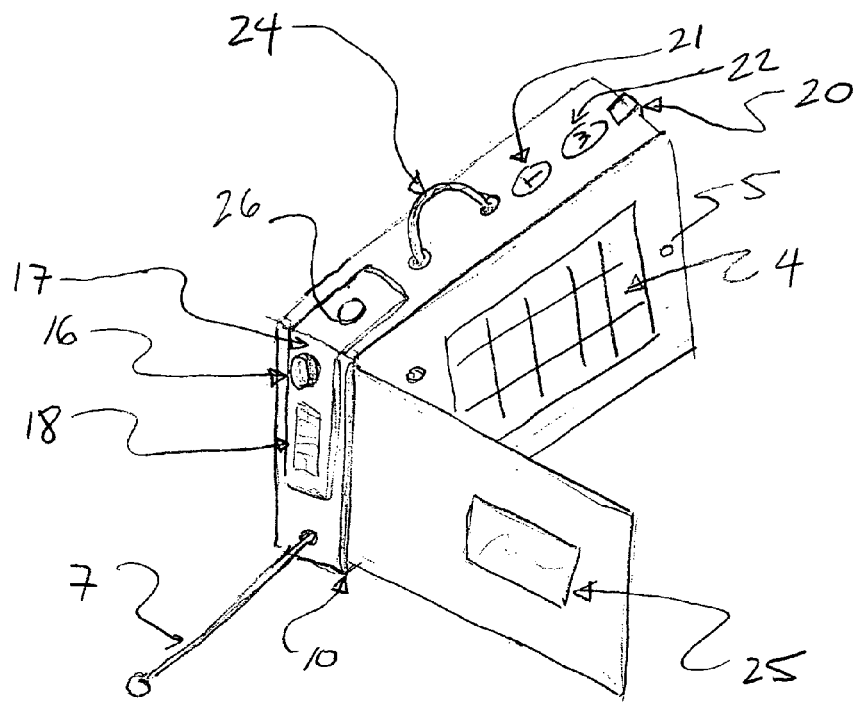
FIG. 7 is a simplified diagram that shows the positions of the shutter button, zoom buttons, strap, camera module release button, removable camera module, camera lens, flash, antenna, hinge, and screen in an alternate embodiment of the apparatus.
Figure 8:
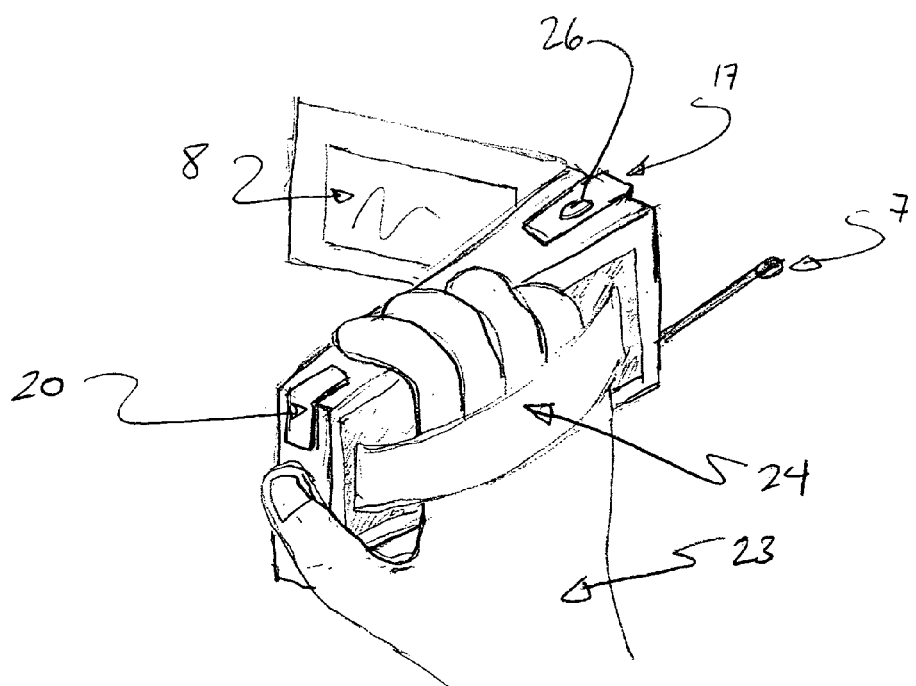
FIG. 8 is a simplified diagram that shows yet another embodiment of the apparatus, including the position of the shutter button, display, battery door, hand strap, antenna, and camera module.

An alternate embodiment to the invention described above limits the maximum hinge angle 11 to the angle of the phone mode 14. Thus, no locking mechanism is needed, saving complexity and cost. As shown in FIG. 7, the camera module 17 may be located right next to the hinge 10 instead of on the side opposite the hinge. The module 17 may also be replaceable and have a removable connection 19 to the keyboard half 2 with electrical pins. A camera module release button 26 may be pressed to unlock the camera module from the keyboard half 2. There may be only one camera mode position angle (~90 degrees) 13 instead of two (~90 and ~270 degrees). The camera lens 16 may be pointed in the opposite direction of the display 8 when the device 1 is in the ~90 degree camera mode 13. FIG. 8 shows how a user may use the device 1 in camera mode by holding the device 1 on its side so that the display 8 is in landscape mode and the lens 16 is pointed away from the user. Straps 24 may be located on the opposite side of the keyboard 4 or on an adjacent side of the keyboard 4 to help the user hold the device 1 in camera mode with one hand. Buttons 20 21 22 may be located on the keyboard half 2 that allows the user to take the picture, zoom in, or zoom out with one hand 23. The user may push the shutter release button 20 with the thumb or index finger, and the zoom in/out buttons 21 22 with the index and/or middle fingers.

In this embodiment, there may be a secondary display 25 on the other side of the main display 8 that allows the user to see what the lens 16 sees when the lens 16 is pointed towards the user. The device 1 may activate the camera mode when the angle 11 is ~90 degrees 13. If the angle 11 is put in the phone mode position 14 right after a picture is taken or right after the angle 11 has been in the camera mode position for a minimum amount of time, the device 1 may activate a picture-browsing mode instead of the phone mode. This picture-browsing mode may allow the user to scan through images that are on the device 1.

What is claimed is:

1. A clam-shell handset device comprising:
a screen half that contains a display; and
a keyboard half that contains keys and, a camera lens, and an image sensor; and
a hinge coupled to a first side of the keyboard half that connects the screen half to the keyboard half and allows the two to rotate with respect to each other through a range of 0 degrees to 270 degrees; wherein the orientation of the image sensor is along a first axis that is perpendicular to a second axis that is pointed in the same direction as the direction the keys move when they are actuated, and further wherein the lens is located on a second side of the keyboard half that is both adjacent to the side with the keys and directly opposite from the first side of the keyboard half that is coupled to the hinge, and is on an opposite side of the device as the display; and
the lens is pointed orthogonal to the second side on which it is located, and wherein the image through the lens can be viewed on the display when the screen half is rotated 270 degrees relative to the keyboard half.

2. A clam-shell handset device comprising:
a screen half that contains a display; and
a keyboard half that contains a keyboard; and
a hinge that connects the screen half to the keyboard half and allows the two to rotate with respect to each other; and
a means for the clam-shell handset device to change its mode of operation depending on the angle of the hinge, wherein a first mode of operation is used to take a picture or video and a second mode of operation is used to make or receive a phone call and a third mode is picture browsing; and
the picture browsing mode shows images stored on the device; and
the picture browsing mode is activated when the hinge is moved from the camera mode angle to the angle for making or receiving a phone call.

3. The device as recited in claim 2 wherein the hinge contains a cam mechanism that encourages the hinge to stay at an angle that activates a mode of operation until a force is applied to the screen half that is greater than the force required to rotate the hinge when the hinge is not at an angle that activates a mode of operation.

4. The device as recited in claim 2 wherein the keyboard half contains at least one strap to aid a user to hold the device.

5. The device as recited in claim 4 wherein the at least one strap has adjustable length.

6. The device as recited in claim 2 wherein picture browsing mode is activated only if the hinge was at the camera mode angle for at least a predetermined amount of time before being moved to the angle for making or receiving a phone call.

7. The device as recited in claim 2 wherein picture browsing mode is activated only if a picture was taken when the hinge was at the camera mode angle before being moved to the angle for making or receiving a phone call.

* * * * *